(12) United States Patent
Watanabe et al.

(10) Patent No.: US 11,186,254 B2
(45) Date of Patent: Nov. 30, 2021

(54) TIRE THEFT MONITORING SYSTEM, TIRE THEFT MONITORING APPARATUS, AND TIRE THEFT MONITORING METHOD

(71) Applicant: BRIDGESTONE CORPORATION, Tokyo (JP)

(72) Inventors: Jun Watanabe, Kokubunji (JP); Shin Sukegawa, Tokyo (JP); Takayuki Ohara, Tokyo (JP); Kenji Matsuo, Kodaira (JP); Kotaro Yamada, Kodaira (JP); Satoshi Hirajima, Kodaira (JP); Suguru Yamaguchi, Kawasaki (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 16/769,584

(22) PCT Filed: Sep. 12, 2018

(86) PCT No.: PCT/JP2018/033884
§ 371 (c)(1),
(2) Date: Jun. 4, 2020

(87) PCT Pub. No.: WO2019/111487
PCT Pub. Date: Jun. 13, 2019

(65) Prior Publication Data
US 2020/0339065 A1 Oct. 29, 2020

(30) Foreign Application Priority Data
Dec. 6, 2017 (JP) .............................. JP2017-234619

(51) Int. Cl.
*B60R 25/102* (2013.01)
*B60C 19/00* (2006.01)
(Continued)

(52) U.S. Cl.
CPC ............ *B60R 25/102* (2013.01); *B60C 19/00* (2013.01); *B60R 25/1001* (2013.01);
(Continued)

(58) Field of Classification Search
None
See application file for complete search history.

(56) References Cited

U.S. PATENT DOCUMENTS 5,541,574 A * 7/1996 Lowe .................. B60C 23/0408
340/447
6,420,967 B1 * 7/2002 Ghabra ............... B60C 23/0408
307/10.2
(Continued)

FOREIGN PATENT DOCUMENTS

EP 3225429 A1 10/2017
JP 2005258932 A 9/2005
(Continued)

OTHER PUBLICATIONS

Jun. 9, 2020, International Preliminary Report on Patentability issued in the International Patent Application No. PCT/JP2018/033884.
(Continued)

*Primary Examiner* — Fekadeselassie Girma
(74) *Attorney, Agent, or Firm* — Kenja IP Law PC

(57) ABSTRACT

A tire theft monitoring system includes a transmitter attached to a tire and configured to transmit tire ID information, a second database configured to store the vehicle ID information of the vehicle and contact information of an owner of the vehicle in association with each other, and a monitoring apparatus mounted on a vehicle to be monitored, and the monitoring apparatus includes a reader configured to perform near field communication with the transmitter attached to the tire mounted on the vehicle to be monitored,
(Continued)

to acquire the tire ID information, and a controller configured to, in a case where the reader cannot acquire the tire ID information, determine that the tire identified with the tire ID information has been stolen and make a notification to contact information stored in the second database in association with vehicle ID information of the vehicle to be monitored.

16 Claims, 7 Drawing Sheets

(51) Int. Cl.
   *B60R 25/10* (2013.01)
   *B60R 25/104* (2013.01)
   *B60R 25/34* (2013.01)

(52) U.S. Cl.
   CPC ............ *B60R 25/104* (2013.01); *B60R 25/34* (2013.01); *B60C 2019/004* (2013.01); *B60R 2025/1013* (2013.01)

(56) References Cited

U.S. PATENT DOCUMENTS

| | | | | |
|---|---|---|---|---|
| 7,230,580 | B1* | 6/2007 | Kelkar | H01Q 1/2208 340/572.7 |
| 2004/0203360 | A1* | 10/2004 | Yamagiwa | B62H 5/20 455/41.1 |
| 2005/0087593 | A1* | 4/2005 | Benedict | B60C 23/0493 235/375 |
| 2006/0007003 | A1* | 1/2006 | Yamagiwa | B62H 5/20 340/572.1 |
| 2006/0180647 | A1* | 8/2006 | Hansen | B60S 3/00 235/375 |
| 2006/0261146 | A1* | 11/2006 | Harada | B60R 13/105 235/375 |
| 2009/0322480 | A1* | 12/2009 | Benedict | G06K 19/07749 340/10.1 |
| 2012/0126967 | A1* | 5/2012 | McCormick | B60C 23/0408 340/445 |
| 2013/0021139 | A1* | 1/2013 | Guo | G06Q 10/10 340/10.1 |
| 2014/0129076 | A1* | 5/2014 | Mouchet | G08G 1/0175 701/29.3 |
| 2015/0186690 | A1* | 7/2015 | Loop | G06Q 10/087 340/10.1 |
| 2015/0314752 | A1* | 11/2015 | Shigetomi | B60R 25/34 340/426.18 |
| 2017/0023441 | A1* | 1/2017 | Luk | B60C 23/04 |
| 2017/0066408 | A1* | 3/2017 | Nyalamadugu | B60R 25/24 |
| 2018/0072264 | A1* | 3/2018 | Gaskin | B60R 25/1001 |
| 2019/0073735 | A1* | 3/2019 | Conlon | G06Q 50/30 |
| 2020/0339065 | A1* | 10/2020 | Watanabe | B60C 19/00 |

FOREIGN PATENT DOCUMENTS

| | | |
|---|---|---|
| JP | 2006088819 A | 4/2006 |
| JP | 2006256361 A | 9/2006 |
| JP | 2010228486 A | 10/2010 |
| JP | 2014117971 A | 6/2014 |
| JP | 2017132292 A | 8/2017 |
| KR | 1020070119781 A | 12/2007 |
| KR | 1020140091108 A | 7/2014 |
| WO | 2007074738 A1 | 7/2007 |
| WO | 2016059487 A1 | 4/2016 |

OTHER PUBLICATIONS

Nov. 20, 2018, International Search Report issued in the International Patent Application No. PCT/JP2018/033884.

Jun. 7, 2021, search result of the Extended European Search Report issued by the European Patent Office in the corresponding European Patent Application No. 18887122.2.

* cited by examiner

FIG. 2

| VEHICLE ID INFORMATION | TIRE ID INFORMATION |
|---|---|
| 0001 | 00001A |
| | 00001B |
| | 00001C |
| | 00001D |
| 0002 | 00002A |
| | 00002B |
| | 00002C |
| | 00002D |
| ⋮ | ⋮ |

FIG. 3

| VEHICLE ID INFORMATION | CONTACT INFORMATION |
|---|---|
| 0001 | ○○@×× |
| 0002 | △△@×× |
| ⋮ | ⋮ |

FIG. 9

| TIRE ID INFORMATION | TIRE STATUS INFORMATION | VEHICLE ID INFORMATION |
|---|---|---|
| 0001A | | 0001 |
| 0002A | | 0002 |
| ⋮ | | ⋮ |

TIRE THEFT MONITORING SYSTEM, TIRE THEFT MONITORING APPARATUS, AND TIRE THEFT MONITORING METHOD

TECHNICAL FIELD

The present disclosure relates to a tire theft monitoring system, a tire theft monitoring apparatus, and a tire theft monitoring method.

BACKGROUND

Among tires to be mounted on a vehicle, there are tires to which RFID (Radio-Frequency Identification) tags for performing near field communication are attached (see, for example, PTL 1).

CITATION LIST

Patent Literature

PTL 1: Japanese Patent Laid-Open No. 2017-132292

SUMMARY

Technical Problem

By the way, damage due to theft of tires mounted on parked vehicles is incurred, and is problematic. Therefore, a technique for monitoring whether or not a tire has been stolen and preventing theft with a simple configuration or method is desired.

An object of the present disclosure which has been made in view of the problem as described above, is to provide a tire theft monitoring system, a tire theft monitoring apparatus, and a tire theft monitoring method which are capable of monitoring whether or not a tire mounted on a vehicle has been stolen, with a simple configuration or method.

Solution to Problem

A tire theft monitoring system as one aspect of the present disclosure is a tire theft monitoring system which monitors theft of a tire mounted on a vehicle, the tire theft monitoring system including a transmitter attached to a tire and configured to transmit tire ID information for identifying the tire, a first database configured to store vehicle ID information for identifying a vehicle and rightful tire ID information which is tire ID information of a rightful tire to be mounted on the vehicle in association with each other, a second database configured to store the vehicle ID information and contact information of an owner of the vehicle identified with the vehicle ID information in association with each other, and a monitoring apparatus mounted on a vehicle to be monitored and configured to monitor whether or not a tire mounted on the vehicle to be monitored has been stolen, the monitoring apparatus including a reader configured to perform near field communication with the transmitter attached to the tire mounted on the vehicle to be monitored, to acquire the tire ID information transmitted by the transmitter, and a controller configured to, in a case where the reader cannot acquire the tire ID information, determine that the tire identified with the tire ID information has been stolen, and make a notification to contact information stored in the second database in association with vehicle ID information of the vehicle to be monitored.

A tire theft monitoring apparatus as one aspect of the present disclosure is a monitoring apparatus which monitors theft of a tire mounted on a vehicle, the tire theft monitoring apparatus including a reader configured to perform near field communication with a transmitter which is attached to a tire and which transmits tire ID information for identifying the tire, to acquire the tire ID information transmitted by the transmitter, and a controller configured to, in a case where the reader cannot acquire the tire ID information, determine that the tire identified with the tire ID information has been stolen, and refer to a database which stores vehicle ID information for identifying a vehicle and contact information of an owner of the vehicle identified with the vehicle ID information in association with each other, to make a notification to contact information stored in association with vehicle ID information of the vehicle to be monitored.

A tire theft monitoring method as one aspect of the present disclosure is a monitoring method for monitoring theft of a tire mounted on a vehicle, the tire theft monitoring method including a step of, by a reader configured to perform near field communication with a transmitter which is attached to a tire and which transmits tire ID information for identifying the tire, acquiring the tire ID information transmitted by the transmitter, and a step of, in a case where the reader cannot acquire the tire ID information, determining that the tire identified with the tire ID information has been stolen, and referring to a database which stores vehicle ID information for identifying a vehicle and contact information of an owner of the vehicle identified with the vehicle ID information in association with each other, to make a notification to contact information stored in association with vehicle ID information of the vehicle to be monitored.

Advantageous Effect

According to the present disclosure, it is possible to provide a tire theft monitoring system, a tire theft monitoring apparatus, and a tire theft monitoring method which are capable of monitoring whether or not a tire mounted on a vehicle has been stolen with a simple configuration or method.

BRIEF DESCRIPTION OF THE DRAWINGS

In the accompanying drawings:

FIG. 2 is a view illustrating a configuration example of a first database illustrated in FIG. 1;

FIG. 3 is a view illustrating a configuration example of a second database illustrated in FIG. 1;

FIG. 9 is a view illustrating a configuration example of a third database illustrated in FIG. 8.

DETAILED DESCRIPTION

Figure 1:
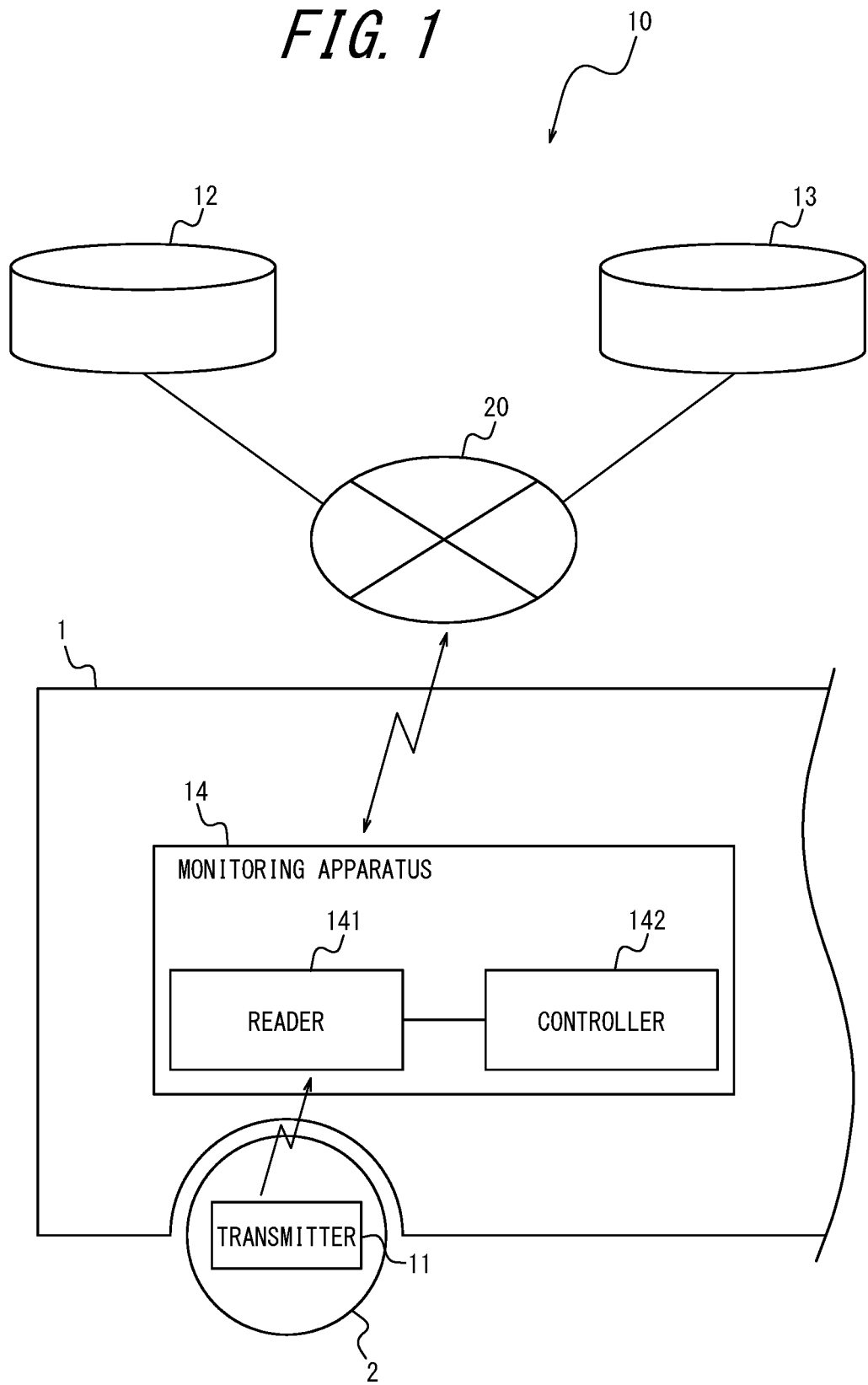
FIG. 1 is a view illustrating a configuration example of a tire theft monitoring system according to an embodiment of the present disclosure.

An embodiment of the present disclosure will be described below with reference to the drawings. Note that, in the respective drawings, the same reference numerals indicate the same or equivalent components.

FIG. 1 is a view illustrating a configuration example of a tire theft monitoring system 10 according to an embodiment of the present disclosure. The tire theft monitoring system 10 according to the present embodiment monitors whether or not a tire 2 mounted on a vehicle 1 has been stolen, and, if it is determined that the tire 2 has been stolen, notifies an owner of the vehicle 1.

The tire theft monitoring system 10 illustrated in FIG. 1 includes a transmitter 11, databases 12 and 13, and a monitoring apparatus 14. The databases 12 and 13 can perform communication with the monitoring apparatus 14 via a network 20. Further, in FIG. 1, while only one monitoring apparatus 14 is illustrated, in the present embodiment, the monitoring apparatuses 14 are respectively mounted on a plurality of vehicles 1, and the monitoring apparatuses 14 can perform communication with each other via the network 20.

The transmitter 11 is attached to the tire 2 mounted on the vehicle 1. The transmitter 11 is, for example, incorporated into the tire 2 (embedded in the tire 2 or pasted on an inner surface of the tire 2). Further, the transmitter 11 may be pasted on an outer surface of the tire 2 if a position where the transmitter 11 is pasted is a position where the transmitter 11 is difficult to be removed from the tire 2, and a position where the transmitter 11 is not affected by contact between the tire 2 and a road surface. The transmitter 11 transmits a predetermined signal, for example, identification information for identifying the tire 2 (hereinafter, referred to as tire ID information) to which the transmitter 11 is attached. Note that the transmitter 11 has a function of storing the tire ID information for identifying the tire 2 to which the transmitter 11 is attached, and transmits this stored tire ID information. Specific examples of the transmitter 11 can include an RFID tag. The RFID tag performs near field (approximately several centimeters to several meters) communication with a reader apparatus using an electromagnetic field, a radio wave, or the like, to exchange information.

As illustrated in FIG. 2, the database 12 (first database) stores identification information for identifying the vehicle 1 (hereinafter, referred to as vehicle ID information), and rightful tire ID information which is tire ID information of at least one tire 2 (a rightful tire rightfully possessed by the owner of the vehicle 1) mounted on the vehicle 1 in association with each other. FIG. 2 illustrates an example where the vehicle ID information of the vehicle 1 is associated with respective pieces of tire ID information of four tires 2 mounted on the vehicle 1. In the database 12, for example, the vehicle ID information of the vehicle 1 and the tire ID information of the tires 2 mounted on the vehicle 1 are stored upon shipment, or the like, of the vehicle 1.

As illustrated in FIG. 3, the database 13 (second database) stores the vehicle ID information of the vehicle 1, and contact information of the owner of the vehicle 1 (for example, contact information (such as an e-mail address) of a terminal apparatus owned by the owner of the vehicle 1) in association with each other. In the database 13, for example, the vehicle ID information of the vehicle 1, and the contact information of the terminal apparatus owned by a purchaser who has purchased the vehicle 1 in association with each other upon sales, or the like, of the vehicle 1. As the terminal apparatus, there are various kinds of apparatuses such as a mobile phone, a smartphone and a tablet terminal, having a communication function.

Note that while, in the present embodiment, the database 12 and the database 13 are separately described, the present disclosure is not limited to this. The vehicle ID information, the tire ID information of the tire 2 mounted on the vehicle 1 identified with the vehicle ID information, and the contact information of the owner of the vehicle 1 may be stored in association with each other on one database.

The monitoring apparatus 14 as the tire theft monitoring apparatus is mounted on the vehicle 1, and monitors whether or not the tire 2 mounted on the vehicle 1 has been stolen. The monitoring apparatus 14 may be incorporated in the vehicle 1 in advance or may be additionally mounted on the vehicle 1. In a case where the monitoring apparatus 14 is incorporated into the vehicle 1, the monitoring apparatus 14 is mounted on, for example, an ECU (Electronic Control Unit) which performs operation control of the vehicle 1.

The monitoring apparatus 14 includes a reader 141 and a controller 142.

The reader 141 regularly performs near field (approximately several centimeters to several meters) communication with the transmitter 11 attached to the tire 2 mounted on the vehicle 1 on which the monitoring apparatus 14 is mounted (hereinafter, referred to as a vehicle to be monitored), for example, at predetermined time intervals (for example, once every several hours), to acquire the tire ID information transmitted by the transmitter 11. A communication distance between the reader 141 and the transmitter 11 is set at a distance such that communication is possible in a state where the tire 2 is mounted on the vehicle 1, and, if the tire 2 is removed from the vehicle 1 and the tire 2 separates from the vehicle 1 by a distance equal to or greater than a predetermined distance, communication becomes impossible. The communication distance between the reader 141 and the transmitter 11 can be adjusted by, for example, a frequency, or the like, to be used for communication. The reader 141 outputs the acquired tire ID information to the controller 142.

In a case where the reader 141 cannot acquire the tire ID information, the controller 142 determines that the tire 2 mounted on the vehicle 1 has been stolen. As described above, the communication distance between the reader 141 and the transmitter 11 is set at a distance such that communication is possible in a state where the tire 2 is mounted on the vehicle 1, and, if the tire 2 is removed from the vehicle 1, and the tire 2 separates from the vehicle 1 by a distance equal to or greater than a predetermined distance, communication becomes impossible. Therefore, in a case where the reader 141 cannot acquire the tire ID information, the state can be estimated as a state where the tire 2 is removed from the vehicle 1 and separates from the vehicle 1 by a distance equal to or greater than the predetermined distance, that is, a state where the tire 2 has been stolen. Therefore, the controller 142 can determine whether or not the tire 2 has been stolen from a communication state between the reader 141 and the transmitter 11.

Operation of the tire theft monitoring system 10 according to the present embodiment will be described next.

Figure 4:
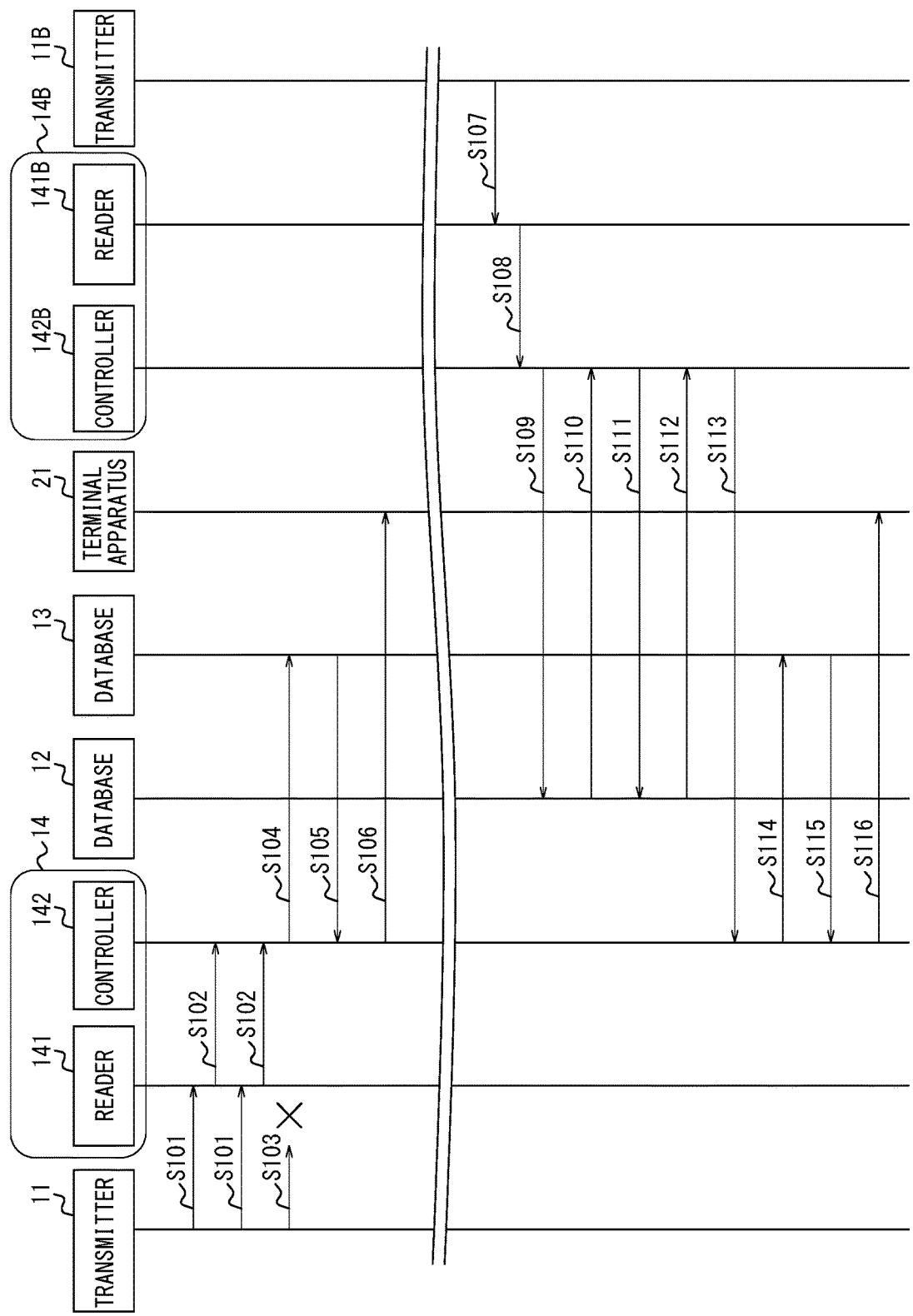
FIG. 4 is a sequence diagram illustrating an example of operation of the tire theft monitoring system illustrated in FIG. 1.

FIG. 4 is a sequence diagram illustrating an example of operation of the tire theft monitoring system 10.

The reader 141 performs near field communication with the transmitter 11 attached to the tire 2 mounted on the vehicle 1 at predetermined time intervals, to acquire the tire ID information of the tire 2 transmitted by the transmitter 11 (step S101). Then, the reader 141 outputs the acquired tire ID information to the controller 142 (step S102).

In a case where the tire ID information is output from the reader 141, that is, in a case where the reader 141 can acquire the tire ID information from the transmitter 11, the controller 142 determines that the tire 2 to which the transmitter 11 is attached is not stolen.

In a case where the tire ID information is not output from the reader 141, that is, in a case where the reader 141 cannot acquire the tire ID information from the transmitter 11 (step S103), the controller 142 determines that the tire 2 to which the transmitter 11 is attached has been stolen.

If the controller 142 determines that the tire 2 has been stolen, the controller 142 refers to the database 13 (step S104) to acquire the contact information stored in the database 13 in association with the vehicle ID information of the vehicle 1 to be monitored (in the present example, the contact information of the terminal apparatus 21 owned by the owner of the vehicle 1 to be monitored) (step S105). Note that the controller 142 stores in advance the vehicle ID information of the vehicle 1 to be monitored (the vehicle 1 on which the monitoring apparatus 14 is mounted).

Then, the controller 142 notifies the terminal apparatus 21 whose contact information has been acquired that the tire 2 has been stolen (step S106). As described above, the terminal apparatus is, for example, a communication apparatus such as a mobile phone, a smartphone and a tablet terminal. These apparatuses normally include a display for displaying various kinds of information. The controller 142 displays and makes a notification that the tire 2 has been stolen, for example, at a display provided at the terminal apparatus 21. Further, the controller 142 may make a notification using sound output in a case where the terminal apparatus 21 has a sound output function.

Figure 5:
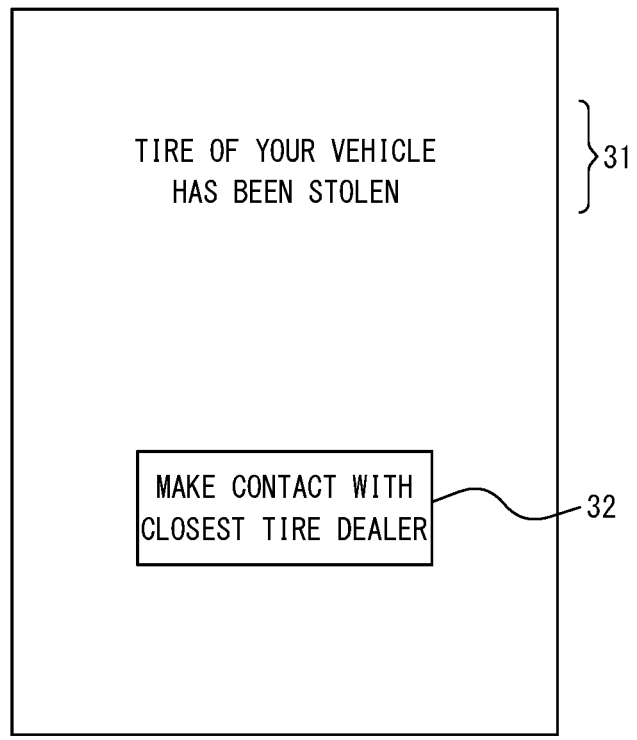
FIG. 5 is a view illustrating an example of display at a display of a terminal apparatus by a controller illustrated in FIG. 1.

Further, as illustrated in FIG. 5, the controller 142 may display a predetermined object 32 (for example, a button) for making contact with a tire dealer closest to the vehicle 1 to be monitored at the display of the terminal apparatus 21 along with a message 31 indicating that the tire 2 has been stolen. If operation for making contact with the closest tire dealer is performed by the predetermined object 32 being depressed, or the like, the terminal apparatus 21 makes contact with the tire dealer through calling, transmission of an e-mail, or the like, to the closest tire dealer. By this means, in a case where the tire 2 of the vehicle 1 has been stolen, the owner of the vehicle 1 can quickly take measures such as purchasing of a new tire. Note that position information of the vehicle 1 can be acquired from, for example, GPS (Global Positioning System) information, or the like, acquired by a car navigation apparatus mounted on the vehicle 1. Further, position information and contact information (such as phone number and an e-mail address) of the tire dealer are stored in advance in, for example, a database which is not illustrated, and which is connected to the network 20. The controller 142 can specify the tire dealer closest to the vehicle 1 to be monitored on the basis of the position information of the vehicle 1 to be monitored and the position information of the tire dealer stored in the database.

Figure 6:
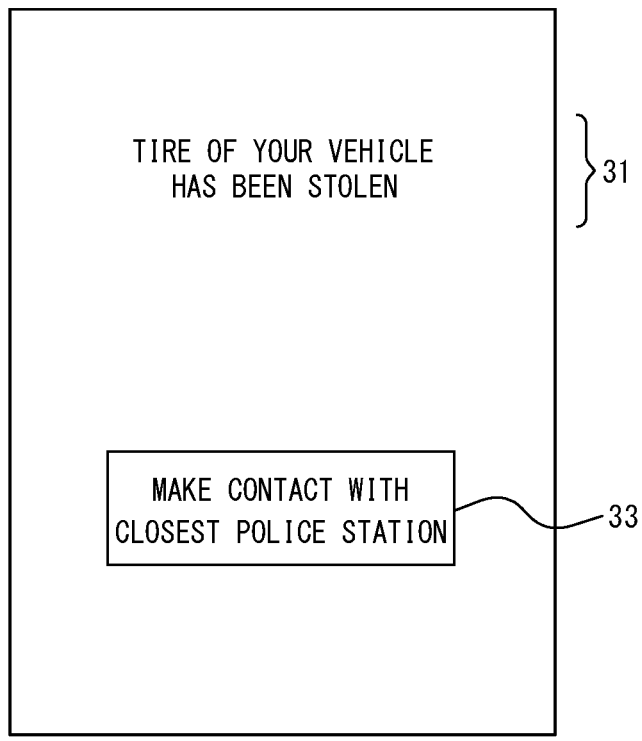
FIG. 6 is a view illustrating another example of display at the display of the terminal apparatus by the controller illustrated in FIG. 1.

Further, as illustrated in FIG. 6, the controller 142 may display a predetermined object 33 (such as a button) for making contact with a predetermined institution (such as a police station and a security company) closest to the vehicle 1 to be monitored at the display of the terminal apparatus 21 along with the message 31 indicating that the tire 2 has been stolen. If operation for making contact with the predetermined institution is performed by the predetermined object 33 being depressed, or the like, the terminal apparatus 21 makes contact with the predetermined institution through calling, transmission of an e-mail, or the like, to the predetermined institution. By this means, in a case where the tire 2 of the vehicle 1 has been stolen, the owner of the vehicle 1 can quickly take measures such as reporting, or the like, to the police station. Note that, as described above, the position information of the vehicle 1 can be acquired from, for example, the GPS information acquired by the car navigation apparatus mounted on the vehicle 1. Further, position information and contact information (such as phone number and an e-mail address) of the predetermined institution such as a police station and a security company are stored in advance in a database which is not illustrated, and which is connected to the network 20. The controller 142 can specify the predetermined institution closest to the vehicle 1 to be monitored on the basis of the position information of the vehicle 1 to be monitored and the position information of the predetermined institution stored in the database.

Further, the controller 142 may determine whether or not there is a possibility that the tire 2 mounted on the vehicle 1 to be monitored may be stolen on the basis of a communication state between the transmitter 11 and the reader 141. Normally, in a state where the tire 2 is mounted on the vehicle 1 which is stopped, a distance between the transmitter 11 and the reader 141 is constant. Therefore, the communication state between the transmitter 11 and the reader 141 is substantially constant. Here, if the tire 2 is removed from the vehicle 1, the communication distance between the transmitter 11 and the reader 141 changes, and the communication state between the transmitter 11 and the reader 141 also changes. Specifically, received strength at the reader 141, of a signal transmitted from the transmitter 11 decreases. The controller 142 monitors the received strength of the signal at the reader 141 and, for example, if the received strength becomes equal to or less than a predetermined threshold, determines that there is a possibility that the tire 2 may be stolen, and issues an alarm to surroundings of the vehicle 1 to be monitored. The controller 142 issues an alarm to the surroundings of the vehicle 1 to be monitored by, for example, running honking of the vehicle 1 to be monitored, displaying information indicating that there is a possibility that the tire 2 may be stolen at a display in a case where the vehicle 1 to be monitored includes the display, or the like. In this manner, by issuing an alarm to the surroundings of the vehicle 1 to be monitored, it is possible to reduce a possibility of the tire 2 being stolen. Further, if the controller 142 determines that there is a possibility that the tire 2 mounted on the vehicle 1 to be monitored may be stolen, the controller 142 may notify the terminal apparatus 21 owned by the owner of the vehicle 1 to be monitored.

Further, the tire theft monitoring system 10 according to the present embodiment may have a function of detecting that a stolen tire is mounted in a case where a tire 2 other than the tire 2 (rightful tire) whose tire ID information (rightful tire ID information) is registered in the database 12, for example, the tire 2 which has been stolen from other vehicles is mounted on the vehicle 1 to be monitored. Operation relating to this function will be described with reference to FIG. 4. In the following description, a vehicle 1B on which the stolen tire is mounted will be referred to as a stolen-tire mounted vehicle 1B. Further, the monitoring apparatus 14, the reader 141 within the monitoring apparatus 14, the controller 142, the transmitter 11 (the transmitter 11 mounted on the stolen tire) and the terminal apparatus 21 (terminal apparatus owned by an owner of the stolen-tire mounted vehicle 1B) on the stolen-tire mounted vehicle 1B side will be respectively referred to as a monitoring apparatus 14B, a reader 141B, a controller 142B, a transmitter 11B and a terminal apparatus 21B.

The reader 141B performs near field communication with the transmitter 11B to acquire tire ID information (step S107) and outputs the tire ID information to the controller 142B (step S108). If the tire ID information is output from the reader 141B, the controller 142B refers to the database 12 (step S109) to acquire the tire ID information stored in the database 12 in association with the vehicle ID information of the vehicle 1 to be monitored (step S110). Then, the controller 142B determines whether or not the tire ID information acquired by the reader 141B matches the tire ID information (rightful tire ID information) acquired from the database 12 (whether the tire ID information acquired by the reader 141B is stored in the database 12 in association with the vehicle ID information of the vehicle 1B). In a case where the tire ID information acquired by the reader 141B is not stored in the database 12 in association with the vehicle ID information of the vehicle 1B, the controller 142B determines that the vehicle 1B (own vehicle) is a stolen-tire mounted vehicle on which a stolen tire is mounted.

If the controller 142B determines that the own vehicle is a stolen-tire mounted vehicle, the controller 142B refers to the database 12 (step S111) to acquire the vehicle ID information stored in the database 12 in association with the tire ID information acquired by the reader 141B (step S112).

Then, the controller 142B notifies the monitoring apparatus 14 (controller 142) mounted on the vehicle 1 identified with the acquired vehicle ID information of information regarding the stolen-tire mounted vehicle 1B (vehicle 1B to be monitored by the monitoring apparatus 14B) (step S113). That is, in a case where the controller 142B determines that the vehicle 1B (own vehicle) on which the monitoring apparatus 14B is mounted is a stolen-tire mounted vehicle on which a stolen tire other than the tire 2 identified with the rightful tire ID information which is stored in the database 12 in association with the vehicle ID information of the own vehicle is mounted, on the basis of the tire ID information acquired by the reader 141B, the controller 142B refers to the database 12 to acquire the vehicle ID information stored in association with the tire ID information acquired by the reader 141B. Then, the controller 142B notifies the monitoring apparatus 14 mounted on the vehicle 1 (vehicle 1 on which the stolen tire mounted on the vehicle 1B has been originally mounted) identified with the acquired vehicle ID information of information regarding the vehicle 1B to be monitored (stolen-tire mounted vehicle 1B).

By this means, in a case where the stolen tire is mounted on the vehicle 1B, because the monitoring apparatus 14 mounted on the vehicle 1 on which the tire 2 has been originally mounted is notified of information regarding the vehicle 1B (stolen-tire mounted vehicle 1B), it becomes easy for an original owner of the stolen tire to track a destination of the stolen tire, specify a person who has stolen the tire 2, or the like. Further, if the stolen tire is mounted on the vehicle 1B, because the monitoring apparatus 14 mounted on the vehicle 1 on which the stolen tire has been originally mounted is notified, use in a state where the stolen tire 2 is mounted is suppressed, so that it is possible to prevent theft of the tire 2.

As described above, in the present embodiment, if the stolen tire 2 (stolen tire) is mounted on the vehicle 1 (vehicle 1B), the monitoring apparatus 14 mounted on the vehicle 1 on which the tire 2 has been originally mounted is notified of information (such as position information and owner information) regarding the vehicle 1B (stolen-tire mounted vehicle 1B). Operation of the monitoring apparatus 14 in a case where a notification of the information regarding the stolen-tire mounted vehicle 1B is made will be described below.

If a notification of the information regarding the stolen-tire mounted vehicle 1B is made from the monitoring apparatus 14B mounted on the stolen-tire mounted vehicle 1B (step S113), the controller 142 refers to the database 13 (step S114) to acquire contact information of the terminal apparatus 21 stored in the database 13 in association with the vehicle ID information of the vehicle 1 to be monitored (step S115).

Then, the controller 142 notifies the terminal apparatus 21 whose contact information has been acquired of the information regarding the stolen-tire mounted vehicle 1B for which a notification has been made from the monitoring apparatus 14B (step S116). The controller 142, for example, displays and makes a notification of the information regarding the stolen-tire mounted vehicle 1B at the display provided at the terminal apparatus 21.

Figure 7:
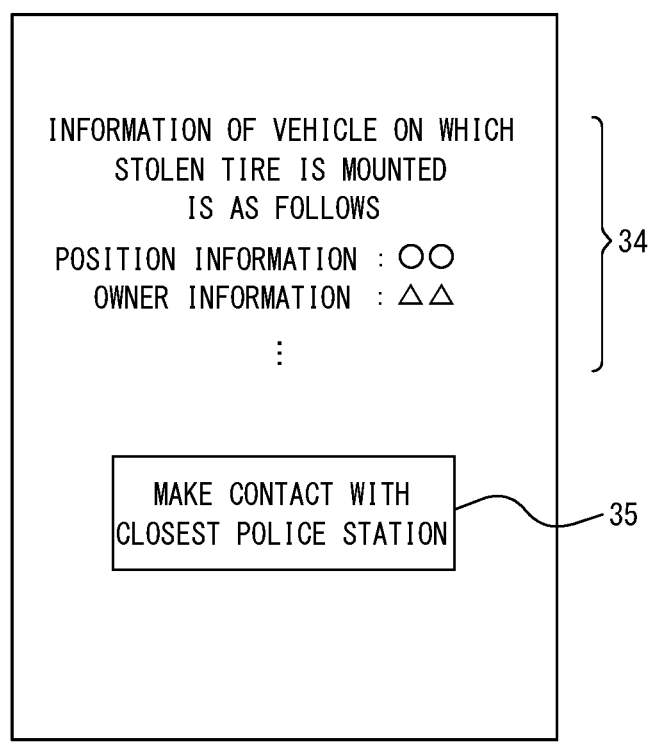
FIG. 7 is a view illustrating still another example of display at the display of the terminal apparatus by the controller illustrated in FIG. 1.

Further, as illustrated in FIG. 7, the controller 142 may display a predetermined object 35 (for example, a button) for informing a predetermined institution (such as a police station and a security company) of the information regarding the stolen-tire mounted vehicle 1B at the display of the terminal apparatus 21 along with the information 34 regarding the stolen-tire mounted vehicle 1B. If operation for making contact with the predetermined institution is performed by the predetermined object 35 being depressed, or the like, the terminal apparatus 21 makes contact as to the information regarding the stolen-tire mounted vehicle 1B through calling, transmission of an e-mail, or the like, to the predetermined institution. By this means, in a case where the tire 2 which has been stolen from the vehicle 1 to be monitored is mounted on the stolen-tire mounted vehicle 1B, the owner of the vehicle 1 to be monitored can take measures such as quick reporting of the information regarding the stolen-tire mounted vehicle 1B to a police station.

Figure 8:
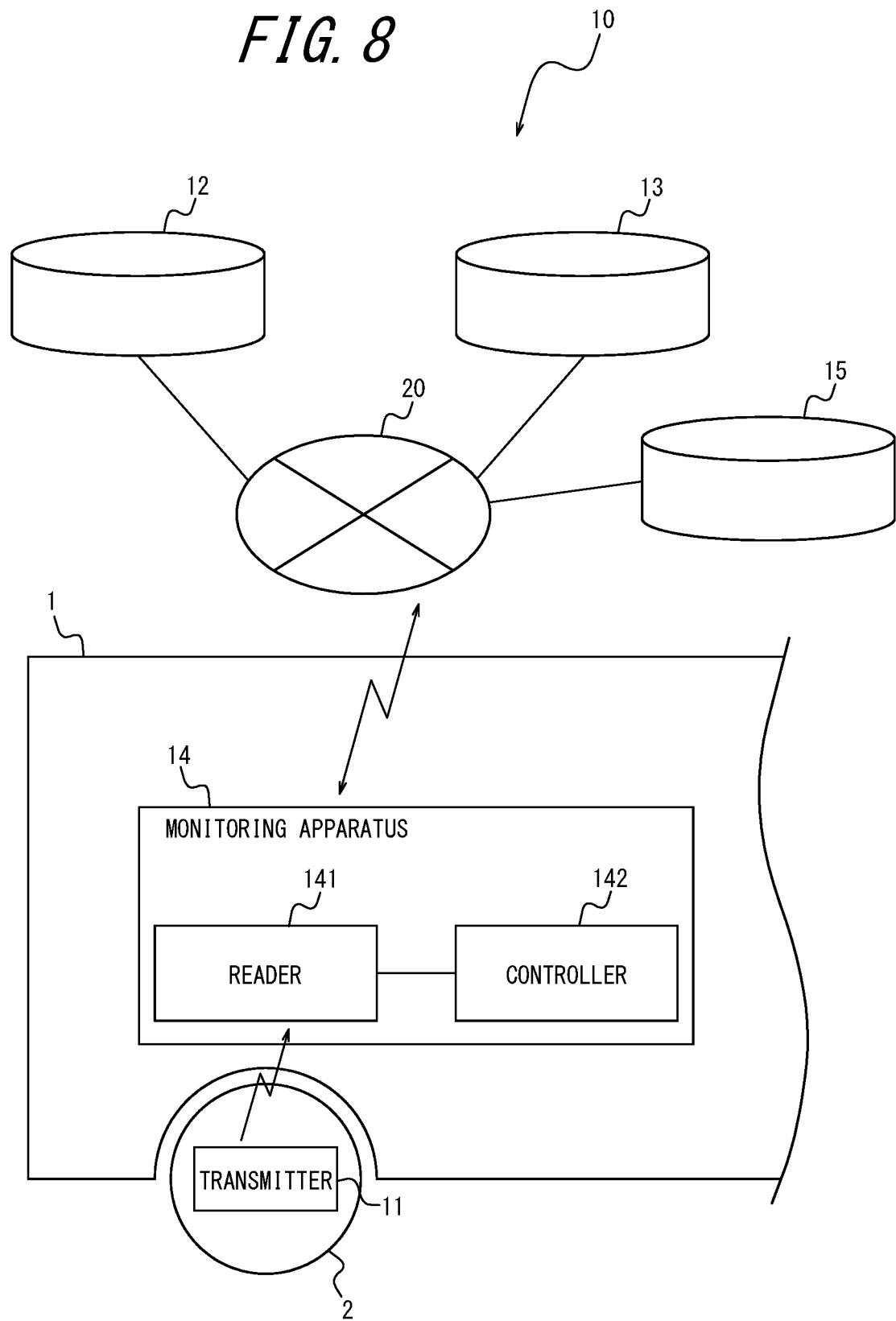
FIG. 8 is a view illustrating another configuration example of the tire theft monitoring system according to an embodiment of the present disclosure.

Note that the tire theft monitoring system 10 according to the present embodiment is not limited to the configuration illustrated in FIG. 1. FIG. 8 is a view illustrating another configuration example of the tire theft monitoring system 10 according to the present embodiment.

The tire theft monitoring system 10 illustrated in FIG. 8 is different from the tire theft monitoring system 10 illustrated in FIG. 1 in that a database 15 is added.

As illustrated in FIG. 9, the database 15 (third database) stores the tire ID information of the tire 2, tire status information indicating whether or not the tire identified with the tire ID information is a stolen tire, and vehicle ID information of the vehicle 1 in which information indicating that the tire 2 identified with the tire ID information is a stolen tire is registered as the tire status information, in association with each other. In the database 15, the tire ID information of the tire 2 is stored, for example, when the tire 2 is mounted on the vehicle 1 to be monitored.

If the controller 142 determines that the tire 2 mounted on the vehicle 1 to be monitored has been stolen, the controller 142 updates the tire status information stored in the database 15 in association with the tire ID information of the tire 2 to information indicating that the tire 2 is a stolen tire. Further, the controller 142 registers the vehicle ID information of the vehicle 1 to be monitored (vehicle 1 whose tire 2 has been stolen) in the database 15 in association with the tire ID information of the tire 2.

Further, if the reader 141 acquires the tire ID information by a new tire 2 being mounted on the vehicle 1 to be monitored, the controller 142 updates the database 12 and refers to the database 15. Then, in a case where information indicating that the tire 2 identified with the tire ID information is a stolen tire is stored as the tire status information in association with the tire ID information, the controller 142 determines that the own vehicle is a stolen-tire mounted vehicle. If the controller 142 determines that the own vehicle is a stolen-tire mounted vehicle, the controller 142 acquires the vehicle ID information stored in the database 15 in association with the tire ID information acquired by the reader 141 (the vehicle ID information of the vehicle on which the tire 2 identified with the tire ID information has been originally mounted). Then, the controller 142 notifies the monitoring apparatus 14 mounted on the vehicle 1 identified with the acquired vehicle ID information of the information regarding the vehicle 1 to be monitored (stolen-tire mounted vehicle).

That is, if the controller 142 determines that the vehicle 1 to be monitored (own vehicle) is a stolen-tire mounted vehicle on which the stolen tire (tire 2 for which information indicating that the tire 2 is a stolen tire has been stored in the database 15) is mounted, the controller 142 notifies the monitoring apparatus 14 mounted on the vehicle 1 on which the tire 2 has been originally mounted of the information regarding the vehicle 1 to be monitored. By this means, because it becomes difficult to use the stolen tire 2 without being noticed by the original owner, it is possible to prevent theft of the tire 2.

Further, if the controller 142 is notified of the information regarding the stolen-tire mounted vehicle, the controller 142 may display a predetermined object for making contact with the closest predetermined institution (such as a police station and a security company) at the display of the terminal apparatus 21 stored in the database 13 in association with the vehicle ID information of the vehicle 1 to be monitored.

By this means, the original owner of the tire 2 mounted on the stolen-tire mounted vehicle can quickly inform the predetermined institution such as a police station and a security company of the information regarding the stolen-tire mounted vehicle.

In this manner, the tire theft monitoring system 10 according to the present embodiment includes the transmitter 11 which is attached to the tire 2 and which transmits tire ID information for identifying the tire 2, the database 12 (first database) which stores vehicle ID information for identifying the vehicle 1, and the tire ID information for identifying the tire 2 mounted on the vehicle 1 in association with each other, the database 13 (second database) which stores the vehicle ID information and contact information of an owner of the vehicle 1 identified with the vehicle ID information in association with each other, and the monitoring apparatus 14 which is mounted on the vehicle 1 to be monitored and which monitors whether or not the tire 2 mounted on the vehicle 1 to be monitored has been stolen. The monitoring apparatus 14 includes the reader 141 which performs near field communication with the transmitter 11 attached to the tire 2 mounted on the vehicle 1 to be monitored to acquire the tire ID information transmitted by the transmitter 11, and the controller 142 which, in a case where the reader 141 cannot acquire the tire ID information, determines that the tire 2 identified with the tire ID information has been stolen and makes a notification to contact information stored in the database 13 in association with the vehicle ID information of the vehicle 1 to be monitored.

Further, the monitoring apparatus 14 as the tire theft monitoring apparatus according to the present embodiment includes the reader 141 which performs near field communication with the transmitter 11 which is attached to the tire 2 and which transmits tire ID information for identifying the tire 2, to acquire the tire ID information transmitted by the transmitter 11, and the controller 142 which, in a case where the reader 141 cannot acquire the tire ID information, determines that the tire 2 identified with the tire ID information has been stolen, and refers to the database 13 which stores vehicle ID information for identifying the vehicle 1 and contact information of an owner of the vehicle 1 identified with the vehicle ID information in association with each other, to make a notification to the contact information stored in association with the vehicle ID information of the vehicle 1 to be monitored.

Further, the tire theft monitoring method according to the present embodiment includes a step of, by the reader 141 which performs near field communication with the transmitter 11 which is attached to the tire 2 and which transmits tire ID information for identifying the tire 2, acquiring the tire ID information transmitted by the transmitter 11, a step of, in a case where the reader 141 cannot acquire the tire ID information, determining that the tire 2 identified with the tire ID information has been stolen, and referring to the database 13 which stores vehicle ID information for identifying the vehicle 1 and contact information of an owner of the vehicle 1 identified with the vehicle ID information in association with each other, to make a notification to contact information stored in association with the vehicle ID information of the vehicle 1 to be monitored.

It is possible to monitor whether or not the tire 2 mounted on the vehicle 1 has been stolen with a simple configuration or method of determining whether or not the reader 141 can acquire tire ID information from the transmitter 11 attached to the tire 2. Further, in a case where it is determined that the tire 2 has been stolen, by notifying the terminal apparatus 21 owned by the owner of the vehicle 1 to be monitored, because it is possible to quickly notify the owner of the vehicle 1 in a case where the tire 2 has been stolen, it is possible to prevent theft of the tire 2.

The tire theft monitoring system, the tire theft monitoring apparatus and the tire theft monitoring method according to the present disclosure are not limited to specific configurations described in the above-described embodiment, and various modifications and changes can be made without deviating from the scope of the claims.

REFERENCE SIGNS LIST 1 vehicle
2 tire
10 tire theft monitoring system
11, 11B transmitter
12 database (first database)
13 database (second database)
14, 14B monitoring apparatus
15 database (third database)
20 network
21 terminal apparatus
141 reader
142 controller

The invention claimed is:
1. A tire theft monitoring system which monitors theft of a tire mounted on a vehicle, the tire theft monitoring system comprising:

a transmitter attached to a tire and configured to transmit tire ID information for identifying the tire;

a first database configured to store vehicle ID information for identifying a vehicle and rightful-tire ID information which is tire ID information of a rightful tire mounted on the vehicle in association with each other;

a second database configured to store the vehicle ID information and contact information of an owner of the vehicle identified with the vehicle ID information in association with each other; and a monitoring apparatus mounted on a vehicle to be monitored and configured to monitor whether or not a tire mounted on the vehicle to be monitored has been stolen, wherein the monitoring apparatus comprises:

a reader configured to perform near field communication with the transmitter attached to the tire mounted on the vehicle to be monitored, to acquire the tire ID information transmitted by the transmitter; and a controller configured to, in a case where the reader cannot acquire the tire ID information, determine that the tire identified with the tire ID information has been stolen, and make a notification to contact information stored in the second database in association with vehicle ID information of the vehicle to be monitored, wherein in a case where the controller determines that the vehicle to be monitored is a stolen-tire mounted vehicle on which a tire other than the tire identified with the rightful tire ID information stored in the first database in association with the vehicle ID information of the vehicle to be monitored is mounted, on a basis of the tire ID information acquired by the reader, the controller refers to the first database to acquire vehicle ID information stored in association with the tire ID information acquired by the reader, and notifies the monitoring apparatus mounted on the vehicle identified with the acquired vehicle ID information of information regarding the stolen-tire mounted vehicle.

2. The tire theft monitoring system according to claim 1, wherein the contact information is contact information of a terminal apparatus which is owned by an owner of the vehicle to be monitored and which has a display, and if the controller determines that the tire mounted on the vehicle to be monitored has been stolen, the controller displays a predetermined object for making contact with a tire dealer at the display of the terminal apparatus stored in the second database in association with the vehicle ID information of the vehicle to be monitored.

3. The tire theft monitoring system according to claim 2, wherein the contact information is contact information of a terminal apparatus which is owned by an owner of the vehicle to be monitored and which has a display, and if the controller determines that the tire mounted on the vehicle to be monitored has been stolen, the controller displays a predetermined object for making contact with a predetermined institution at the display of the terminal apparatus stored in the second database in association with the vehicle ID information of the vehicle to be monitored.

4. The tire theft monitoring system according to claim 3, wherein, if the controller determines that there is a possibility that the tire mounted on the vehicle to be monitored may be stolen on a basis of a communication state between the reader and the transmitter, the controller issues an alarm to surroundings of the vehicle to be monitored.

5. The tire theft monitoring system according to claim 2, wherein, if the controller determines that there is a possibility that the tire mounted on the vehicle to be monitored may be stolen on a basis of a communication state between the reader and the transmitter, the controller issues an alarm to surroundings of the vehicle to be monitored.

6. The tire theft monitoring system according to claim 1, wherein the contact information is contact information of a terminal apparatus which is owned by an owner of the vehicle to be monitored and which has a display, and if the controller determines that the tire mounted on the vehicle to be monitored has been stolen, the controller displays a predetermined object for making contact with a predetermined institution at the display of the terminal apparatus stored in the second database in association with the vehicle ID information of the vehicle to be monitored.

7. The tire theft monitoring system according to claim 6, wherein, if the controller determines that there is a possibility that the tire mounted on the vehicle to be monitored may be stolen on a basis of a communication state between the reader and the transmitter, the controller issues an alarm to surroundings of the vehicle to be monitored.

8. The tire theft monitoring system according to claim 1, wherein, if the controller determines that there is a possibility that the tire mounted on the vehicle to be monitored may be stolen on a basis of a communication state between the reader and the transmitter, the controller issues an alarm to surroundings of the vehicle to be monitored.

9. The tire theft monitoring system according to claim 1, wherein, if a notification of the information regarding the stolen-tire mounted vehicle is made, the controller notifies the contact information stored in the second database in association with the vehicle ID information of the vehicle to be monitored of the information regarding the stolen-tire mounted vehicle.

10. The tire theft monitoring system according to claim 1, wherein the contact information is contact information of a terminal apparatus which is owned by an owner of the vehicle to be monitored and which has a display, and if a notification of the information regarding the stolen-tire mounted vehicle is made, the controller displays a predetermined object for informing a predetermined institution of the information regarding the stolen-tire mounted vehicle at the display of the terminal apparatus stored in the second database in association with the vehicle ID information of the vehicle to be monitored.

11. A tire theft monitoring system which monitors theft of a tire mounted on a vehicle, the tire theft monitoring system comprising:

a transmitter attached to a tire and configured to transmit tire ID information for identifying the tire;

a first database configured to store vehicle ID information for identifying a vehicle and rightful-tire ID information which is tire ID information of a rightful tire mounted on the vehicle in association with each other;

a second database configured to store the vehicle ID information and contact information of an owner of the vehicle identified with the vehicle ID information in association with each other; and a monitoring apparatus mounted on a vehicle to be monitored and configured to monitor whether or not a tire mounted on the vehicle to be monitored has been stolen, wherein the monitoring apparatus comprises:

a reader configured to perform near field communication with the transmitter attached to the tire mounted on the vehicle to be monitored, to acquire the tire ID information transmitted by the transmitter, and a controller configured to, in a case where the reader cannot acquire the tire ID information, determine that the tire identified with the tire ID information has been stolen, and make a notification to contact information stored in the second database in association with vehicle ID information of the vehicle to be monitored, wherein the tire theft monitoring system further comprises:

a third database configured to store the tire ID information, tire status information indicating whether or not the tire identified with the tire ID information is a stolen tire, and vehicle ID information of a vehicle in which information indicating that the tire identified with the tire ID information is a stolen tire is registered as the tire status information, in association with each other, wherein, if the controller determines that the tire identified with the tire ID information acquired by the reader has been stolen, the controller updates the tire status information stored in the third database in association with the tire ID information to information indicating that the tire identified with the tire ID information is a stolen tire, and if the reader acquires the tire ID information, the controller refers to the third database, and, in a case where information indicating that the tire identified with the tire ID information is a stolen tire is stored as the tire status information, determines that the vehicle to be monitored is a stolen-tire mounted vehicle on which a stolen tire is mounted, acquires vehicle ID information stored in the third database in association with the tire ID information and notifies the monitoring apparatus mounted on the vehicle identified with the acquired vehicle ID information of information regarding the vehicle to be monitored.

12. The tire theft monitoring system according to claim 11, wherein the contact information is contact information of a terminal apparatus which is owned by an owner of the vehicle to be monitored and which has a display, and if a notification of the information regarding the stolen-tire mounted vehicle is made, the controller displays a predetermined object for making contact with a predetermined institution at the display of the terminal apparatus stored in the second database in association with the vehicle ID information of the vehicle to be monitored.

13. A monitoring apparatus which monitors theft of a tire mounted on a vehicle to be monitored, the monitoring apparatus comprising:

a reader configured to perform near field communication with a transmitter which is attached to a tire and which transmits tire ID information for identifying the tire, to acquire the tire ID information transmitted by the transmitter; and a controller configured to, in a case where the reader cannot acquire the tire ID information, determine that the tire identified with the tire ID information has been stolen, and refer to a second database which stores vehicle ID information for identifying a vehicle and contact information of an owner of the vehicle identified with the vehicle ID information in association with each other, to make a notification to contact information stored in association with vehicle ID information of the vehicle to be monitored, wherein the vehicle ID information and rightful-tire ID information which is tire ID information of a rightful tire mounted on the vehicle are stored in a first database in association with each other and in a case where the controller determines that the vehicle to be monitored is a stolen-tire mounted vehicle on which a tire other than the tire identified with the rightful tire ID information stored in the first database in association with the vehicle ID information of the vehicle to be monitored is mounted, on a basis of the tire ID information acquired by the reader, the controller refers to the first database to acquire vehicle ID information stored in association with the tire ID information acquired by the reader, and notifies the monitoring apparatus mounted on the vehicle identified with the acquired vehicle ID information of information regarding the stolen-tire mounted vehicle.

14. A monitoring method for monitoring theft of a tire mounted on a vehicle to be monitored, the monitoring method comprising:

a step of, by a reader configured to perform near field communication with a transmitter which is attached to a tire and which transmits tire ID information for identifying the tire, acquiring the tire ID information transmitted by the transmitter; and a step of, in a case where the reader cannot acquire the tire ID information, determining that the tire identified with the tire ID information has been stolen, and referring to a database which stores vehicle ID information for identifying a vehicle and contact information of an owner of the vehicle identified with the vehicle ID information in association with each other, to make a notification to contact information stored in association with vehicle ID information of the vehicle to be monitored, wherein the vehicle ID information and rightful-tire ID information which is tire ID information of a rightful tire mounted on the vehicle are stored in a first database in association with each other and in a case where the controller determines that the vehicle to be monitored is a stolen-tire mounted vehicle on which a tire other than the tire identified with the rightful tire ID information stored in the first database in association with the vehicle ID information of the vehicle to be monitored is mounted, on a basis of the tire ID information acquired by the reader, the controller refers to the first database to acquire vehicle ID information stored in association with the tire ID information acquired by the reader, and notifies the monitoring apparatus mounted on the vehicle identified with the acquired vehicle ID information of information regarding the stolen-tire mounted vehicle.

15. A monitoring apparatus which monitors theft of a tire mounted on a vehicle to be monitored, the monitoring apparatus comprising:

a reader configured to perform near field communication with a transmitter which is attached to a tire and which transmits tire ID information for identifying the tire, to acquire the tire ID information transmitted by the transmitter; and a controller configured to, in a case where the reader cannot acquire the tire ID information, determine that the tire identified with the tire ID information has been stolen, and refer to a second database which stores vehicle ID information for identifying a vehicle and contact information of an owner of the vehicle identified with the vehicle ID information in association with each other, to make a notification to contact information stored in association with vehicle ID information of the vehicle to be monitored, wherein the tire ID information, tire status information indicating whether or not the tire identified with the tire ID information is a stolen tire, and vehicle ID information of a vehicle in which information indicating that the tire identified with the tire ID information is a stolen tire is registered as the tire status information are stored in a third database in association with each other, wherein, if the controller determines that the tire identified with the tire ID information acquired by the reader has been stolen, the controller updates the tire status information stored in the third database in association with the tire ID information to information indicating that the tire identified with the tire ID information is a stolen tire, and if the reader acquires the tire ID information, the controller refers to the third database, and, in a case where information indicating that the tire identified with the tire ID information is a stolen tire is stored as the tire status information, determines that the vehicle to be monitored is a stolen-tire mounted vehicle on which a stolen tire is mounted, acquires vehicle ID information stored in the third database in association with the tire ID information and notifies the monitoring apparatus mounted on the vehicle identified with the acquired vehicle ID information of information regarding the vehicle to be monitored.

16. A monitoring method for monitoring theft of a tire mounted on a vehicle to be monitored, the monitoring method comprising:

a step of, by a reader configured to perform near field communication with a transmitter which is attached to a tire and which transmits tire ID information for identifying the tire, acquiring the tire ID information transmitted by the transmitter; and a step of, in a case where the reader cannot acquire the tire ID information, determining that the tire identified with the tire ID information has been stolen, and referring to a second database which stores vehicle ID information for identifying a vehicle and contact information of an owner of the vehicle identified with the vehicle ID information in association with each other, to make a notification to contact information stored in association with vehicle ID information of the vehicle to be monitored, wherein the tire ID information, tire status information indicating whether or not the tire identified with the tire ID information is a stolen tire, and vehicle ID information of a vehicle in which information indicating that the tire identified with the tire ID information is a stolen tire is registered as the tire status information are stored in a third database in association with each other, wherein, if determining that the tire identified with the tire ID information acquired by the reader has been stolen, updating the tire status information stored in the third database in association with the tire ID information to information indicating that the tire identified with the tire ID information is a stolen tire, and if acquiring the tire ID information, referring to the third database, and, in a case where information indicating that the tire identified with the tire ID information is a stolen tire is stored as the tire status information, determining that the vehicle to be monitored is a stolen-tire mounted vehicle on which a stolen tire is mounted, acquiring vehicle ID information stored in the third database in association with the tire ID information and notifying the monitoring apparatus mounted on the vehicle identified with the acquired vehicle ID information of information regarding the vehicle to be monitored.

* * * * *